United States Patent
Achanta et al.

(10) Patent No.: US 9,599,719 B2
(45) Date of Patent: Mar. 21, 2017

(54) DETECTION OF MANIPULATED SATELLITE TIME SIGNALS

(71) Applicant: Schweitzer Engineering Laboratories, Inc., Pullman, WA (US)

(72) Inventors: Shankar V. Achanta, Pullman, WA (US); David E. Whitehead, Pullman, WA (US); Francis J. Cooper, Dowingtown, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 656 days.

(21) Appl. No.: 14/053,347

(22) Filed: Oct. 14, 2013

(65) Prior Publication Data

US 2014/0247185 A1   Sep. 4, 2014

Related U.S. Application Data

(60) Provisional application No. 61/716,400, filed on Oct. 19, 2012.

(51) Int. Cl.
*G01S 19/20* (2010.01)
*G01S 19/21* (2010.01)

(52) U.S. Cl.
CPC .............. *G01S 19/20* (2013.01); *G01S 19/21* (2013.01)

(58) Field of Classification Search
CPC ........................................ G01S 19/20
USPC ................................... 342/357.58
See application file for complete search history.

(56) References Cited

U.S. PATENT DOCUMENTS

| 5,160,926 A | 11/1992 | Schweitzer |
| 5,537,143 A | 7/1996 | Steingold |
| 5,557,284 A | 9/1996 | Hartman |
| 5,737,715 A | 4/1998 | Deaton |
| 5,995,911 A | 11/1999 | Hart |
| 6,061,573 A | 5/2000 | Goldberg |
| 6,144,334 A | 11/2000 | Claffey |
| 6,229,479 B1 | 5/2001 | Kozlov |
| 6,388,997 B1 | 5/2002 | Scott |
| 6,463,049 B1 | 10/2002 | Abe |

(Continued)

FOREIGN PATENT DOCUMENTS

| WO | 9747987 | 12/1997 |
| WO | WO 00/16525 | 3/2000 |

(Continued)

OTHER PUBLICATIONS

International Preliminary Report on Patentability, PCT/US2013/064942, Apr. 21, 2015.*

(Continued)

*Primary Examiner* — Frank J McGue
(74) *Attorney, Agent, or Firm* — Jared L. Cherry (57) ABSTRACT

Disclosed herein is a system for detecting manipulation of a GNSS signal and mitigating against such manipulation. A GNSS receiver receives GNSS signals from a plurality of GNSS satellites, and calculates event times for each GNSS satellite. The GNSS receiver then compares a next event time for a particular GNSS satellite with an expected next event time for the particular GNSS satellite. If the difference between the expected next event time and the next event times exceeds a predetermined threshold, then the GNSS receiver indicates that signal integrity may be compromised.

20 Claims, 4 Drawing Sheets

(56) References Cited

U.S. PATENT DOCUMENTS

| | | |
|---|---|---|
| 6,483,856 B1 | 11/2002 | Bird |
| 6,940,931 B2 | 9/2005 | Ito |
| 6,999,440 B2 | 2/2006 | Abe |
| 7,146,516 B2 | 12/2006 | Dhupar |
| 7,170,884 B1 | 1/2007 | Radimirsch |
| 7,174,258 B2 | 2/2007 | Hart |
| 7,266,713 B2 | 9/2007 | Lienhart |
| 7,272,201 B2 | 9/2007 | Whitehead |
| 7,363,009 B2 | 4/2008 | Erlenbach |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,573,913 B2 | 8/2009 | Terry |
| 7,577,220 B2 | 8/2009 | Becker |
| 7,606,541 B1 | 10/2009 | Nicholls |
| 7,616,682 B2 | 11/2009 | Small |
| 7,617,408 B2 | 11/2009 | Frazier |
| 7,714,735 B2 | 5/2010 | Rockwell |
| 7,746,269 B2 | 6/2010 | Kamimura |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 7,986,270 B2 | 7/2011 | Heidari-Bateni |
| 8,055,288 B2 | 11/2011 | Ladd |
| 8,082,367 B2 | 12/2011 | Etheridge |
| 8,138,972 B2 | 3/2012 | Underbrink |
| 8,145,247 B2 | 3/2012 | Fullam |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 8,712,244 B2 | 4/2014 | Hasegawa |
| 8,867,520 B2 | 10/2014 | Nicholls |
| 9,083,503 B2 | 7/2015 | Sagen |
| 9,270,442 B2 | 2/2016 | Rice |
| 9,319,100 B2 | 4/2016 | Achanta |
| 2001/0023464 A1 | 9/2001 | Deck |
| 2002/0136172 A1 | 9/2002 | Chun |
| 2002/0158693 A1 | 10/2002 | Soong |
| 2002/0167934 A1 | 11/2002 | Carter |
| 2003/0084190 A1 | 5/2003 | Kimball |
| 2003/0087654 A1 | 5/2003 | Wheeler |
| 2003/0107513 A1 | 6/2003 | Abraham |
| 2004/0062279 A1 | 4/2004 | Primrose |
| 2004/0166879 A1 | 8/2004 | Meadows |
| 2004/0228368 A1 | 11/2004 | Jecmen |
| 2006/0259806 A1 | 11/2006 | Zweigle |
| 2007/0132773 A1 | 6/2007 | Plante |
| 2007/0194987 A1 | 8/2007 | Fedora |
| 2008/0062039 A1 | 3/2008 | Cohen |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0310570 A1 | 12/2009 | Smith |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0127928 A1 | 5/2010 | Thomson |
| 2010/0190509 A1 | 7/2010 | Davis |
| 2010/0222068 A1 | 9/2010 | Gaal |
| 2010/0231445 A1 | 9/2010 | Tarlow |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001668 A1 | 1/2011 | Cobb |
| 2011/0035066 A1 | 2/2011 | Schweitzer |
| 2011/0068973 A1 | 3/2011 | Humphreys |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1 | 5/2012 | Higgison |
| 2012/0179404 A1 | 7/2012 | Lee |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0111377 A1 | 4/2014 | Achanta |
| 2014/0232595 A1 | 8/2014 | Rife |
| 2014/0250972 A1 | 9/2014 | Achanta et al. |
| 2014/0327574 A1 | 11/2014 | Achanta |
| 2014/0334477 A1 | 11/2014 | Stahlin |
| 2015/0043697 A1 | 2/2015 | Achanta |

FOREIGN PATENT DOCUMENTS

| | | |
|---|---|---|
| WO | 2012151006 | 11/2012 |
| WO | 2014005016 | 1/2014 |

OTHER PUBLICATIONS

PCT/US2015/029939 Patent Cooperation Treaty, International Search Report and Written Opinion of the International Searching Authority, Aug. 12, 2015.

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, Dec. 19, 2013.

PCT/US2013/064942 Patent Cooperation Treaty, International Search Report and Written Opinion of the International Searching Authority, Jan. 29, 2014.

Tippenhauer, N.O., Popper, C., Rasmussen, K.B., Capkun, S., "On the Requirements for Successful GPS Spoofing Attacks", In Proceedings of the ACM Conference on Computer and Communications Security (CCS), 2011.

Moore, P., Crossley, P., "GPS Applications in Power Systems Part 1 Introduction to GPS", Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoof- (56) References Cited

OTHER PUBLICATIONS ing Techniques", International Journal of Navigation and Observation vol. 2012, Article ID 127072, 2012.
Wullems, C., "A Spoofing Detection Method for Civilian L1 GPS and the E1-B Galileo Safety of Life Service". IEEE Transactions on Aerospace and Electronic Systems, 2011.
Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.
PCT/US2014/034358 Patent Cooperation Treaty, International Search Report and Written Opinion of the International Searching Authority, Sep. 22, 2014.
Shepard, D., Humphreys, T., Fansler, A., "Evaluation of the Vulnerability of Phasor Measurement Units to GPS Spoofing Attacks", Oct. 2, 2011.
PCT/US2014/010422 Patent Cooperation Treaty, International Search Report and Written Opinion of the International Searching Authority, Sep. 16, 2014.
PCT/US2013/058297, Patent Cooperation Treaty, International Search Report and Written Opinion of the International Searching Authority, Feb. 14, 2014.
PCT/US2013/065695, Patent Cooperation Treaty, International Search Report and Written Opinion of the International Searching Authority, Mar. 10, 2014.
PCT/US2013/065447, Patent Cooperation Treaty, International Search Report and Written Opinion of the International Searching Authority, Mar. 13, 2014.
PCT/US2015/054144 Patent Cooperation Treaty, International Search Report and Written Opinion of the International Searching Authority, Jan. 4, 2016.
PCT/US2014/049813 Patent Cooperation Treaty, International Search Report and Written Opinion of the International Searching Authority, Apr. 2, 2015.
PCT/US2015/024000 Patent Cooperation Treaty, International Search Report and Written Opinion of the International Searching Authority, Jul. 13, 2015.
PCT/US2014/010507 Patent Cooperation Treaty, International Search Report and Written Opinion of the International Searching Authority, May 6, 2014.
Thou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1.
North American SynchroPhasor Initiative (NASPI), Performance & Standards Task Team (PSTT), Guidelines for Synchronization Techniques Accuracy and Availability, Dec. 30, 2008.
D. Mills, Network Working Group, Request for Comments 4330, Simple Network Time Protocol (SNTP) Version 4 for IPv4, IPv6, and OSI, Jan. 2006.
PCT/US2012/068915 Patent Cooperation Treaty, International Search Report and Written Opinion of the International Searching Authority, Mar. 26, 2013.

* cited by examiner

DETECTION OF MANIPULATED SATELLITE TIME SIGNALS

RELATED APPLICATION

The present application claims the benefit under 35 U.S.C. §119(e) of U.S. Provisional Patent Application No. 61/716,711 filed Oct. 19, 2012 and titled "Detection of Manipulated Satellite Signals" which application is incorporated herein by reference in its entirety.

TECHNICAL FIELD

This disclosure relates to a satellite synchronized clock capable of detecting manipulated satellite signals. More particularly, this disclosure relates to maintaining a history of satellite views and comparing the history against present satellite views.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1:
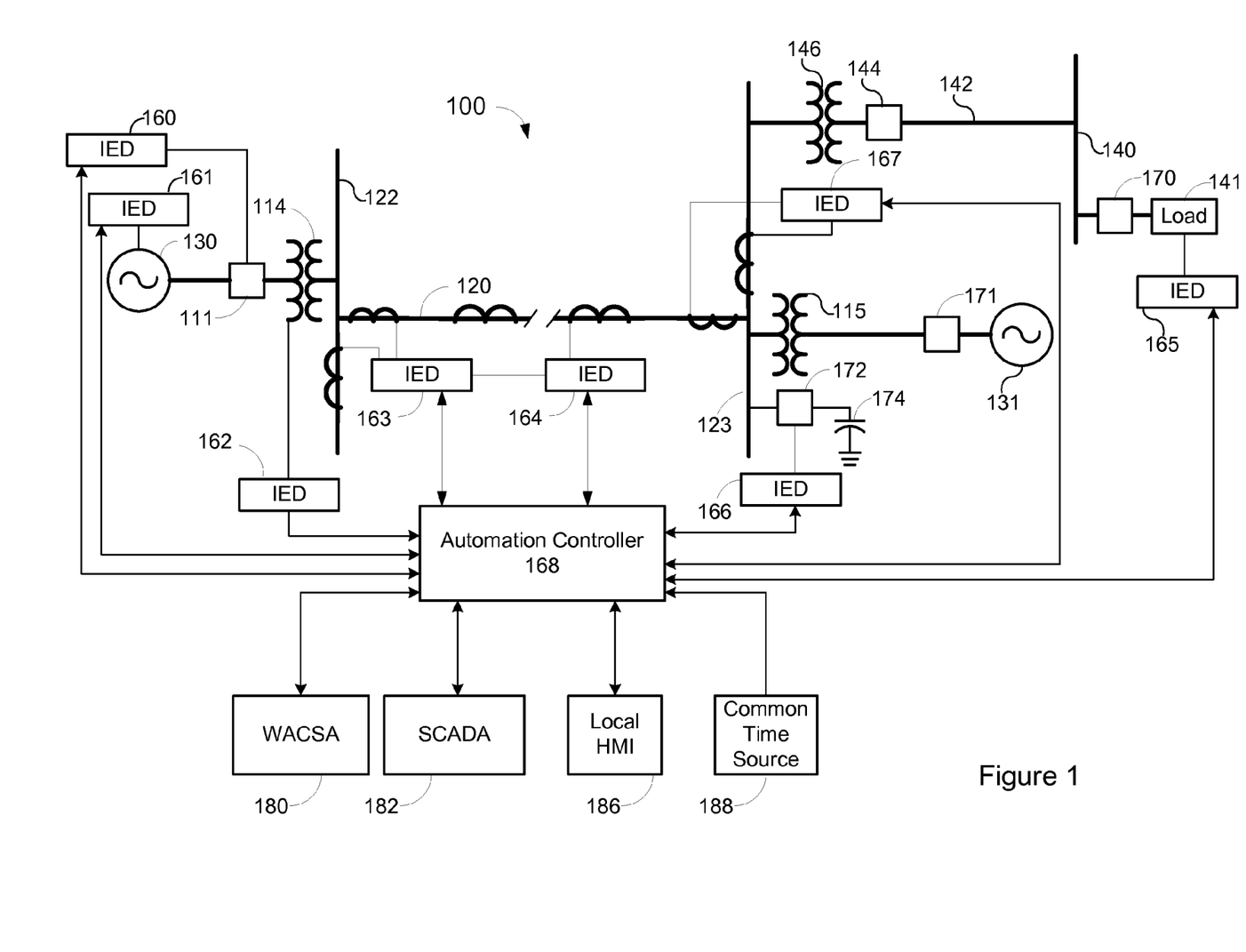
FIG. 1 illustrates a simplified one-line diagram of an electric power delivery system.

FIG. 1 illustrates a simplified diagram of an example of an electric power delivery system 100 consistent with embodiments disclosed herein. The systems and methods described herein may be applied and/or implemented in the system electric power delivery system 100 illustrated in FIG. 1. Although illustrated as a one-line diagram for purposes of simplicity, an electrical power delivery system 100 may also be configured as a three-phase power system. The electric power delivery system 100 may include, among other things, electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

As mentioned above, modern electric power delivery systems (which may include electric power generation systems, transmission systems, distribution systems, and consumption systems) are controlled using intelligent electronic devices (IEDs). FIG. 1 illustrates several IEDs 160-167 that may be configured to control the one or more elements of the electric power delivery system. An IED may be any processor-based device that controls monitored equipment within an electric power delivery system (e.g., system 100). In some embodiments, the IEDs 160-167 may gather equipment status from one or more pieces of monitored equipment (e.g., generator 130). Equipment status may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive GOOSE messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 142 and/or the WACSA system 140. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

As is detailed above, the electric power delivery system 100 illustrated in FIG. 1 includes local control and protection using IEDs 160-167, and wide-area control using the automation controller 168 and/or WACSA 180 and/or SCADA 182.

Figure 2:
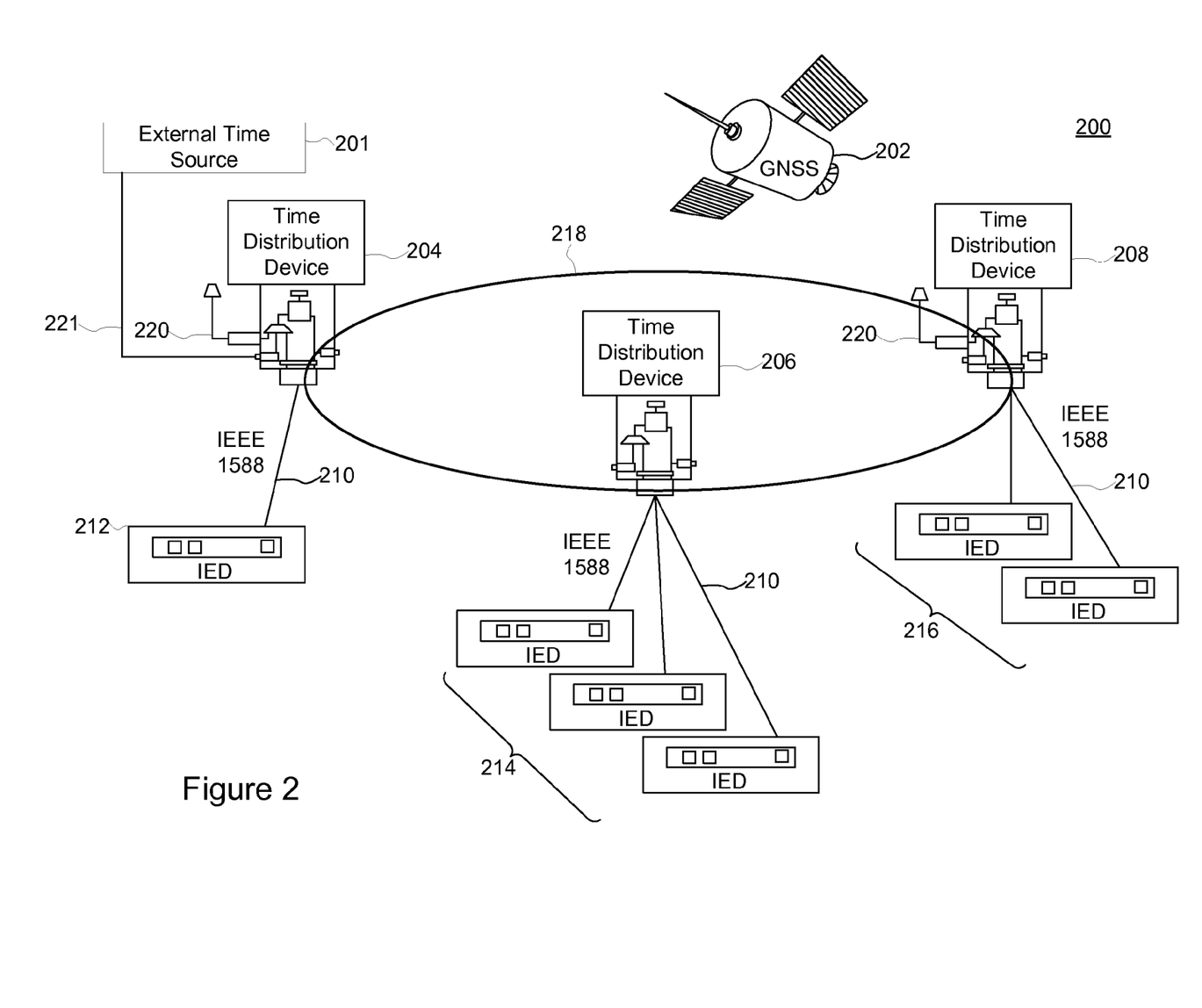
FIG. 2 illustrates a simplified diagram of a communication system.

FIG. 2 illustrates system 200 configured to be a highly reliable, redundant, and distributed system of time distribution devices 204, 206, and 208 capable of providing a precision time reference to various time dependent IEDs 212, 214, and 216. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a distribution hub, a substation, a load center, or other location where one or more IEDs are found. In various embodiments, an IED may include a WAN port, and such an IED may be directly connected to WAN 218. IEDs may be connected via WAN 218 or connection 210. Connection 210 may be, for example, a local area network (LAN) or a dedicated time communication link, such as an Inter-Range Instrumentation Group (IRIG) compliant communication link. In various embodiments, connection 210 may include multiple connections, for example, both a LAN and IRIG connection. Time distribution devices 204, 206, and 208 may establish and maintain a precision time reference among various system components. Each time distribution device 204, 206, and 208 may be configured to communicate time information with IEDs connected on connection 210 through one or more time distribution protocols, such as IEEE 1588.

Each time distribution device 204, 206, and 208 is configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more VCTCXOs, phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a SONET configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

According to various embodiments, time distribution devices 204, 206, and 208 are configured to perform at least one of the methods of detecting failure of a time source described herein. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated by the user entering compensation settings, or may need to be estimated by the time synchronization network. Estimation may be performed during long periods of "quiet" operation (i.e., periods with no faults), with the individual source results stored locally in a nonvolatile storage register.

As can be seen, IEDs may receive time signals from one or more GNSS signals. Different IEDs may receive time signals from one or more GNSS signal sources that are different from the GNSS signal sources for other IEDs. That is, several different GNSS sources are available. The GPS system, for example, consists of around 32 satellites that orbit the Earth twice per sidereal day. Accordingly, several satellites are visible to each receiver at any given time, and different satellites may be visible to different receivers at different times each day.

Signals from the GNSS satellites arrive at the receivers, and may be used by the receivers to calculate position as well as time. Receivers in the systems of FIGS. 1 and 2 are typically stationary, and use the GNSS signals to calculate time, and provide a common time to devices on the system.

Receivers of such signals may be vulnerable to attacks or manipulation such as blocking, jamming, and spoofing. In some cases, the GNSS receiver may continue to indicate that the signal is good, and signal lock may be maintained. Such attacks may attempt to prevent a position lock, or feed a receiver false information such that the receiver calculates a false position and/or time. Spoofing, or other manipulation, of time information in a system such as those of FIGS. 1 and 2 may introduce errors in the derived values by the IEDs, and/or errors into time stamps of equipment status, measurements, derived values, and communications among the devices. Such errors may result in improper control of the electric power delivery system. Accordingly, what is needed is detection of, and mitigation against such attacks.

As mentioned briefly above, GNSS systems such as GPS are susceptible to attacks such as electromagnetic signal hijacking, in a manner that is difficult for the clock device receiving the broadcast timing signal to detect. Once the broadcast signal is manipulated, then false information can be injected causing the clock device to send out incorrect location and timing information.

GNSS satellites typically orbit the Earth twice per sidereal day (23 h 56 m 4.1 s). During a portion of each orbit, each satellite is within view of a GNSS receiver for a period of time. During one sidereal day, a GNSS receiver will typically receive a signal from a particular GNSS satellite during two separate time periods.

Figure 3:
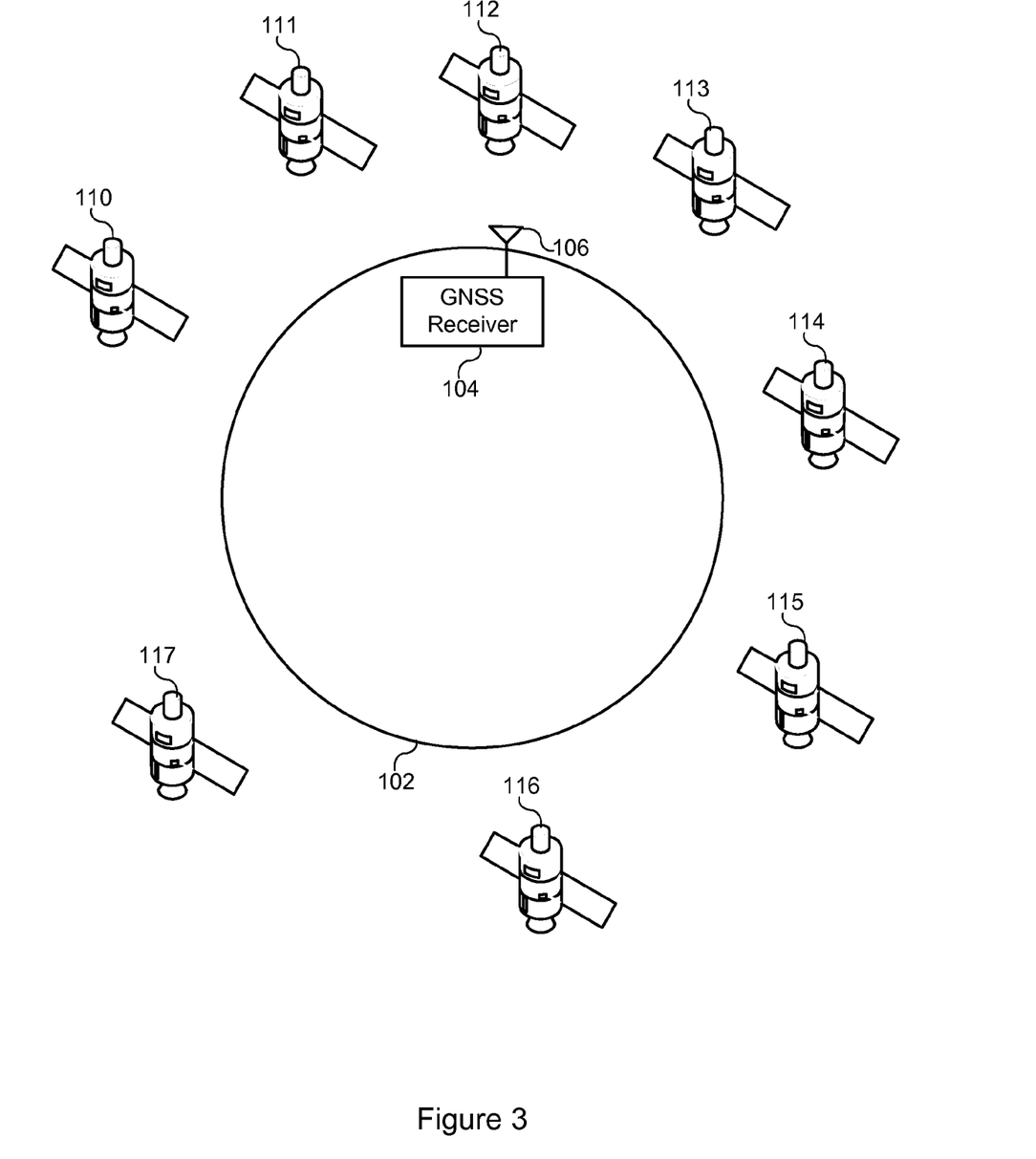
FIG. 3 illustrates GNSS receiver in communication with a subset of GNSS satellites.

FIG. 3 illustrates a representation of a number of satellites (110-117) positioned around the Earth 102. A GNSS receiver 104 may be located at a stationary position upon the Earth 102. At a particular point in time, due to the stationary position of the receiver 104, only a subset of the GNSS satellites 110-117 may be visible to the antenna 106. For example, at a particular point in time, the antenna only receives a signal from satellites 111-113. All other GNSS satellites 110, 114-117 are beyond the horizon, where their signals do not reach antenna 106. As GNSS satellites 110-117 orbit the Earth 102 they come into view of the antenna 106, and exit view of the antenna 106 on a particular schedule. For example, as mentioned above, GPS satellites each typically orbit the earth twice per sidereal day and would be within the view of antenna 106 twice per sidereal day. Thus, the GNSS receiver 104 may determine specific times at which each of the GNSS satellites are to come into view, and specific times at which each of the GNSS satellites are to exit view of the antenna 106.

Once the GNSS receiver 104 has established a history of the times at which each GNSS satellite enters and exits view of antenna 106, the receiver 104 can compare future events with the history. That is, once a particular GNSS satellite comes into view, the GNSS receiver may compare the time at which the particular GNSS satellite entered view of the antenna 106 with the history. If the particular GNSS satellite came into view at an unexpected time according to the history, the GNSS receiver may determine that the signal not reliable, may be manipulated, and/or may be from a source other than the particular GNSS satellite.

To establish the history, the GNSS receiver 104 may track events such as times a particular satellite enters view, and times at which a particular satellite leaves view. Such events may be used to calculate a time that the next event is expected for each satellite. Table 1 illustrates satellite identification numbers (Satellite PRN), times each satellite enters view, times each satellite leaves view, and calculated times of the next expected event for each satellite. The GNSS receiver may then record the time the next expected event happens, compare the time with the calculated time, and if the difference exceeds a predetermined threshold, the GNSS receiver may detect that the signal integrity may be compromised.

TABLE 1

| Satellite PRN | Time In | Time Out | Time In | Time Out | Next Expected |
|---|---|---|---|---|---|
| 1 | 12:00:00.0 | 17:59:01.0 | 23:58:02.0 | 5:57:03.1 | 11:56:04.1 |
| 2 | 13:02:36.4 | 19:47:09.4 | 1:00:38.4 | 7:45:11.5 | 12:58:40.5 |
| 3 | 5:21:41.9 | 11:30:55.4 | 17:19:43.9 | 23:28:57.5 | 5:17:46.0 |
| 4 | 9:12:25.5 | 15:37:38.6 | 21:10:27.5 | 3:35:40.7 | 9:08:29.6 |
| 5 | 19:34:26.7 | 1:34:28.7 | 7:32:28.7 | 13:32:30.8 | 19:30:30.8 |
| 6 | 23:46:01.2 | 6:45:04.3 | 11:44:03.2 | 18:43:06.4 | 23:42:05.3 |

In one embodiment, the GNSS receiver may calculate a time for the next event for a particular GNSS satellite. When the next event occurs, the GNSS receiver may compare the event time with the expected event time. If the difference between the expected event time and the event time exceed a predetermined threshold, the GNSS receiver may indicate that signal integrity may be compromised.

When the GNSS receiver detects compromised signal integrity, it may simply not use the signal from the GNSS satellite in its calculation of the time, location, or the like. In another embodiment, when the GNSS receiver detects compromised signal integrity, it may refrain from using signals from any GNSS satellites in its calculation of the time, location, or the like. In any case, if the GNSS receiver provides a time signal to consuming devices, it may indicate in its provided time signal that a signal integrity has been compromised. For example, the GNSS receiver may set a TIME_OK bit to a negative indication when it detects that signal integrity of one or more GNSS signals has been compromised.

To enhance security of the calculated time signal, the GNSS receiver may monitor signal strengths of the particular GNSS satellites. For each GNSS satellite tracked by the GNSS receiver, the receiver may monitor and record signal strengths for each satellite. It has been observed that as an individual GNSS satellite comes into view of a GNSS receiver, the signal strength of that GNSS satellite follows a pattern of ramping up to a particular somewhat stable signal strength, and as an individual GNSS satellite sets from view of the GNSS receiver the signal strength of that GNSS satellite follows a pattern of ramping down to zero signal strength. It is anticipated that other patterns of signal strength while a GNSS satellite comes into view of a GNSS receiver or sets from view of a GNSS receiver may be observed. In some observations, the ramping up of signal strength when a GNSS satellite comes into view is faster than the ramping down of signal strength when a GNSS satellite sets from view.

Along with the recording of observable events, the GNSS receiver may record the signal strength patterns for each observed GNSS satellite when coming into view and when setting from view. The GNSS receiver may establish an acceptable signal strength pattern for each event for each GNSS satellite. The established acceptable signal strength pattern may be calculated using statistical methods applied to a number of previously recorded signal strength patterns for the particular event. The established acceptable signal strength pattern may include an acceptable region of signal strength patterns. The established acceptable signal strength pattern may include minimum signal strengths that must be met by certain times during an event, where the minimum signal strengths are based on the observed signal strengths during previous events.

In one embodiment, the acceptable signal strength patterns may be used to establish acceptable windows of time for an event to occur. That is, to avoid false detection of compromised signal integrity, the GNSS receiver may compare measured signal strengths during an event and compare the measured signal strengths to the established acceptable signal strength pattern for the expected event. If the measured signal strength is within a predetermined threshold of deviation from the acceptable signal strength pattern for the particular event, then the signal from that particular GNSS satellite may be used in the calculation of location and/or a time signal. Otherwise, the GNSS receiver may determine that the signal from that GNSS satellite may be compromised, and may then not use that signal in the calculation of location and/or a time signal, or may notify consuming devices that the time signal has been compromised, as described above. In another embodiment, the GNSS receiver may simply establish a window for each expected event based on the acceptable signal strength patterns. If expected events occur within the established window, then the GNSS receiver may continue to use the signal from the particular GNSS satellite. Otherwise, the GNSS receiver may detect compromised signal integrity and take an action as described above such as not using the signal from that particular satellite in calculation of location and/or time, or notify consuming devices that the time signal has been compromised, or the like.

Figure 4:
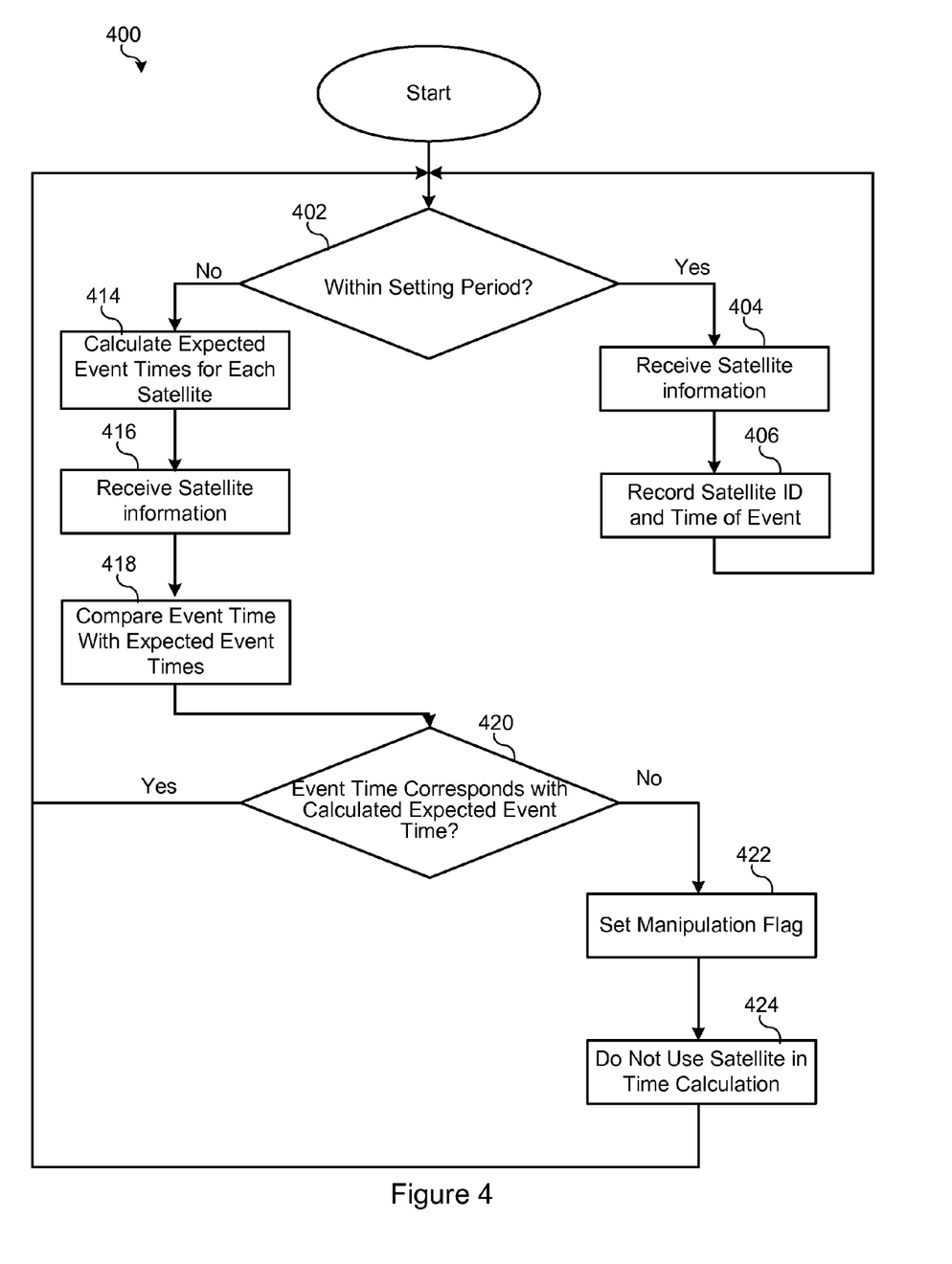
FIG. 4 illustrates a method for detecting manipulated GNSS signals using event times.

FIG. 4 illustrates a method 400 for detecting manipulated GNSS signals. The method starts with the GNSS receiver determining whether it is within a predetermined setting period 402. The setting period may be a period of sufficient time to establish a history of events for the GNSS satellites that provide signals for the GNSS receiver. In one embodiment, the setting period may be a sidereal day. In another embodiment, the setting period may be half of a sidereal day. In yet another embodiment, the setting period may be several sidereal days. If the GNSS receiver is within the setting period, then the GNSS receiver receives satellite information at 404. The GNSS receiver then records the satellite identification and the time of the event at 406, and returns to determine whether it is still within the setting period. The time of event may be the time that the particular satellite comes into view of the antenna. The time of the event may be the time that the particular satellite leaves view of the antenna. The time of event may be the time of any event that repeats itself on a predictable schedule.

If the GNSS receiver is not within the setting period 402, then the GNSS receiver calculates expected event times for each satellite, at 414, using the recorded satellite identification and time of event obtained during the setting period. As described above, the step of calculating expected event times for each satellite 414 may comprise determining an acceptable signal strength pattern from the detected signal strength patterns during observed events. The step 414 may further comprise calculating an event window for each expected event based on the acceptable signal strength pattern for each event. The GNSS receiver then continues to receive satellite information, at 416, which may include satellite signal strength information, and compare a detected event time with the calculated expected event times, at 418. As further described above, the step of comparing an event time with an expected event time 418 may include comparing an event time against a calculated event window for the particular expected event. The step 418 may additionally comprise comparing satellite signal strengths against a determined acceptable signal strength pattern for the particular event. If the event time corresponds with the calculated expected event time (e.g., occurs within the event window or the satellite signal strength corresponds with the determined acceptable signal strength pattern), at 420, for the particular satellite, then the GNSS receiver returns to determine if the method is within the setting period 402. The event time may be determined to correspond with the calculated expected event time if a difference between the event time and the expected event time does not exceed a predetermined threshold. If the GNSS receiver determines that the event time does not correspond with the calculated expected time, the GNSS receiver sets a manipulation flag, at 422, which may include an indication that signal integrity has been compromised. The GNSS receiver then does not use the signal from that particular GNSS satellite in its time calculation 424, and returns to 402.

Such an integrity check as described herein may further be used to detect noise jamming. For GNSS receivers that do not include automatic gain control (AGC), a noise jamming signal may be seen as additional false satellites (coming into and/or out of view at unexpected times). For GNSS receivers that do include AGC, a noise jamming signal may make correct satellite signals disappear, again causing events at unexpected times.

Accordingly, detecting attacks as described herein may be used to detect both noise jamming as well as deceptive transmissions that contain incorrect, forged, or manipulated satellite signals.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A Global Navigational Satellite System (GNSS) receiver for providing a time signal to consuming devices, comprising:
    an antenna for receiving one or more GNSS signals from one or more GNSS satellites;
    a processor;
    a communications interface for communicating the time signal to the consuming devices; and
    a non-transitory computer-readable storage medium comprising instructions that enable the processor to:
        for a particular GNSS satellite of the one or more GNSS satellites, determine event times for a repeating event;
        for the particular GNSS satellite, calculate an expected next event time from the determined event times;
        for the particular GNSS satellite, determine an acceptable signal strength pattern for each event, wherein the calculated expected next event time comprises a time window based on the acceptable signal strength pattern;
        detect a next event time for the particular GNSS satellite;
        calculate a difference between the detected next event time with the calculated expected next event time for the particular GNSS satellite; and
        indicate compromised signal integrity when the difference exceeds a predetermined threshold.

2. The GNSS receiver of claim 1, wherein the GNSS receiver communicates compromised signal integrity to the consuming devices.

3. The GNSS receiver of claim 1, wherein the repeating event comprises a particular satellite coming into view of the antenna.

4. The GNSS receiver of claim 1, wherein the repeating event comprises a particular satellite leaving view of the antenna.

5. The GNSS receiver of claim 1, wherein the consuming devices comprise intelligent electronic devices (IEDs) in communication with an electric power delivery system.

6. The GNSS receiver of claim 1, wherein the instructions further enable the processor to calculate a time signal to provide to the consuming devices.

7. The GNSS receiver of claim 6, wherein the instructions further enable the processor to not use a signal from a particular GNSS satellite when the difference exceeds a predetermined threshold.

8. The GNSS receiver of claim 1, wherein the instructions further enable the processor to:
    compare a signal strength of the particular GNSS satellite during the event with the acceptable signal strength pattern for the event; and
    indicate compromised signal integrity when a difference between the signal strength of the particular GNSS satellite and the acceptable signal strength pattern exceeds a predetermined threshold.

9. A method for detecting manipulation of satellite signals comprising:
    recording events associated with each of one or more Global Navigational Satellite System (GNSS) satellites by a GNSS receiver;
    generating, by the GNSS receiver, an expected time for a next event based on the recorded events;
    determining an acceptable signal strength pattern for the next event, wherein the generated expected time comprises a time window based on the acceptable signal strength pattern for the next event;
    detecting the next event;
    comparing an actual time of the detected next event with the expected time for the next event; and
    indicating a compromised GNSS signal in response to determining that the actual time of the detected event varies from the expected time for the next event by a defined threshold.

10. The method of claim 9, further comprising communicating the compromised GNSS signal to a consuming device.

11. The method of claim 9, wherein the events associated with each of one or more GNSS satellites comprises a particular satellite coming into view of the antenna.

12. The method of claim 9, wherein the events associated with each of one or more GNSS satellites comprises a particular satellite leaving view of the antenna.

13. The method of claim 9, wherein:
    comparing the actual time with the expected time comprises comparing the actual time with the calculated time window.

14. The method of claim 9 further comprising comparing a signal strength pattern of during the event with the acceptable signal strength pattern for the event.

15. The method of claim 9, further comprising calculating a time signal from the GNSS satellites.

16. The method of claim 15, further comprising not using a signal from a particular GNSS satellite in the calculation of the time signal when the time of the detected event varies from the expected time for the next event by greater than a defined threshold.

17. A method comprising:
    recording events associated with each of one or more Global Navigational Satellite System (GNSS) satellites by a GNSS receiver;
    generating, by the GNSS receiver, an expected time for a next event based on the recorded events;
    determining, by the GNSS receiver, an acceptable signal strength pattern for the next event, wherein the generated expected time for the next event comprises a time window based on the acceptable signal strength pattern for the next event;
    comparing an actual time of the next event with the expected time for the next event; and
    distributing a precision time reference based on a signal from the one or more GNSS satellites, in response to determining that the actual time of the detected event is within a threshold time of the expected time for the next event.

18. The method of claim 17, wherein the events associated with each of one or more GNSS satellites comprises a particular satellite coming into view of the antenna.

19. The method of claim 17, wherein the events associated with each of one or more GNSS satellites comprises a particular satellite leaving view of the antenna.

20. A Global Navigational Satellite System (GNSS) receiver for providing a time signal to consuming devices, comprising:
- an antenna for receiving one or more GNSS signals from one or more GNSS satellites;
- a processor;
- a communications interface for communicating the time signal to the consuming devices; and
- a non-transitory computer-readable storage medium comprising instructions that enable the processor to:
  - for a particular GNSS satellite of the one or more GNSS satellites, determine event times for a repeating event;
  - for the particular GNSS satellite, calculate an expected next event time from the determined event times;
  - for the particular GNSS satellite, determine an acceptable signal strength pattern for each event,
  - detect a next event time for the particular GNSS satellite;
  - calculate a signal strength difference between the signal strength pattern for the particular GNSS satellite during the event and the acceptable signal strength pattern for the event;
  - calculate a time difference between the detected next event time and the calculated expected next event time for the particular GNSS satellite; and
  - indicate compromised signal integrity when one or more of the time difference exceeds a predetermined threshold, and the signal strength difference exceeds a predetermined threshold.

* * * * *